United States Patent [19]

Gahler

[11] 4,081,739
[45] Mar. 28, 1978

[54] CIRCUIT FOR QUICK CHARGING OF BATTERIES

[75] Inventor: Egon Gahler, Hattersheim, Germany

[73] Assignee: Braun Aktiengesellschaft, Frankfurt am Main, Germany

[21] Appl. No.: 763,584

[22] Filed: Jan. 28, 1977

[30] Foreign Application Priority Data

Feb. 4, 1976 Germany .............................. 2604198

[51] Int. Cl.² .................................................. H02J 7/10
[52] U.S. Cl. ........................................ 320/32; 320/35; 320/39; 320/DIG. 2
[58] Field of Search ...................... 320/32, 35, 36, 39, 320/40, DIG. 2, 20; 323/22 SC

[56] References Cited

U.S. PATENT DOCUMENTS

| | | | |
|---|---|---|---|
| 3,538,415 | 11/1970 | Wilson | 320/35 X |
| 3,586,955 | 6/1971 | Kisiel | 320/32 X |
| 3,748,568 | 7/1973 | Ackermann | 320/DIG. 2 X |
| 3,876,921 | 4/1975 | Bigbee | 320/39 X |
| 3,969,665 | 7/1976 | Rowas | 323/22 SC X |
| 3,979,658 | 9/1976 | Foster | 320/39 X |
| 4,006,397 | 2/1977 | Catotti et al. | 320/35 X |

*Primary Examiner*—Robert J. Hickey
*Attorney, Agent, or Firm*—Michael J. Striker

[57] ABSTRACT

The circuit includes voltage supply terminals for connection to a voltage source and battery connection terminals for connection to a battery to be charged. Circuitry connects the voltage supply terminals to the battery connection terminals for the transmission of a charging voltage and provides a current path for the flow of charging current. A controllable switch is connected to the charging current path and has conductive and non-conductive states. A second controllable switch is connected to the first controllable switch and is operative upon the receipt of a control signal having a predetermined threshold value for changing the state of the first controllable switch. The second controllable switch receives a control signal whose value varies in dependence upon variations in the charging current and/or the charging voltage. Circuitry is provided for changing the threshold value of the second controllable switch in automatic dependence upon changes in the charging current and/or the charging voltage.

17 Claims, 2 Drawing Figures

4,081,739

CIRCUIT FOR QUICK CHARGING OF BATTERIES

BACKGROUND OF THE INVENTION

The invention relates to a circuit arrangement for effecting quick-charging of a battery.

More particularly, the invention relates to circuit arrangements of this type in which a voltage source is connected to the battery by a first controllable electronic switch, and in which a second controllable electronic switch renders the first switch conductive or non-conductive in dependence upon the charging voltage or the charging current of the battery.

Quick-charge circuits of this type operate with a high charging current, which normally leads relatively soon to reaching of the gassing voltage of the battery. If the gassing voltage is reached, further charging of the battery can result in its destruction. Accordingly, in order to achieve a quick but nevertheless safe charging of the battery, it is necessary to switch over from the high-amperage quick-charge charging current to a low-amperage trickle-charge charging current shortly before the gassing voltage is reached. The voltage at which this switchover should occur is referred to herein as the switchover voltage.

The value of the gassing voltage is not a constant, but depends upon the type of battery involved, the ambient temperature, and the charging current or the voltage producing the charging current.

It is already known to provide a quick-charge charging circuit so designed that a switchover to the trickle-charging occurs shortly before the gassing voltage of the battery is reached. This known arrangement adequately takes into account the effect of temperature upon the value of the gassing voltage, upon the electronic switchover component, and upon the charging voltage applied directly across the battery. However, it does not take into account the effect upon the switchover of fluctuations in the voltage applied across the input terminals of the charging circuit and accordingly of the charging current. If the voltage applied to the input terminals of the charging circuit briefly increases or decreases, then with the known charging circuit, an elevated or reduced charging voltage is simulated, and the circuit improperly switches over from quick-charge to trickle-charge, or vice versa. The possibility of such improper switchover is to be avoided, because supply voltage fluctuations of the type in question are frequently encountered when utilizing utility-company mains voltages. Improper switchover can result also from supply voltages which do not fluctuate but protractedly have a magnitude or amplitude higher or lower than anticipated by the designer of the charging circuit.

SUMMARY OF THE INVENTION

It is a general object of the invention to provide a charging circuit of the general type in question, but not characterized by the problems discussed above, and so designed that too early or too late switchover from quick-charging to trickle-charging does not occur in response to fluctuations in the supply voltage applied to the circuit or in response to persistent elevation or depression of the supply voltage.

According to one concept of the invention, this object can be met by providing a coupling arrangement which generates a signal whose value is proportional to the charging voltage or the charging current of the circuit, with this signal being applied to the second switch unit in such a way as to vary the threshold value which the control signal applied to the second switch unit must reach to cause the second switch unit to change the conductivity state of the first switch unit. Accordingly, the threshold value of the control signal for the second switch unit will be controlled in dependence upon the charging voltage or the charging current.

One of the main advantages of the invention concept is that the threshold value of the control signal for the second switch unit is automatically adjusted for too high or two low supply voltages applies to the input of the charging circuit, and in such a manner that despite such improper supply voltage values the change of conductivity state of the first switch unit will always occur at the proper time.

Additionally, charging circuits designed in accordance with the inventive concepts can meet very limited space requirements, so that they can be utilized even in small devices independent of utility company mains voltages.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
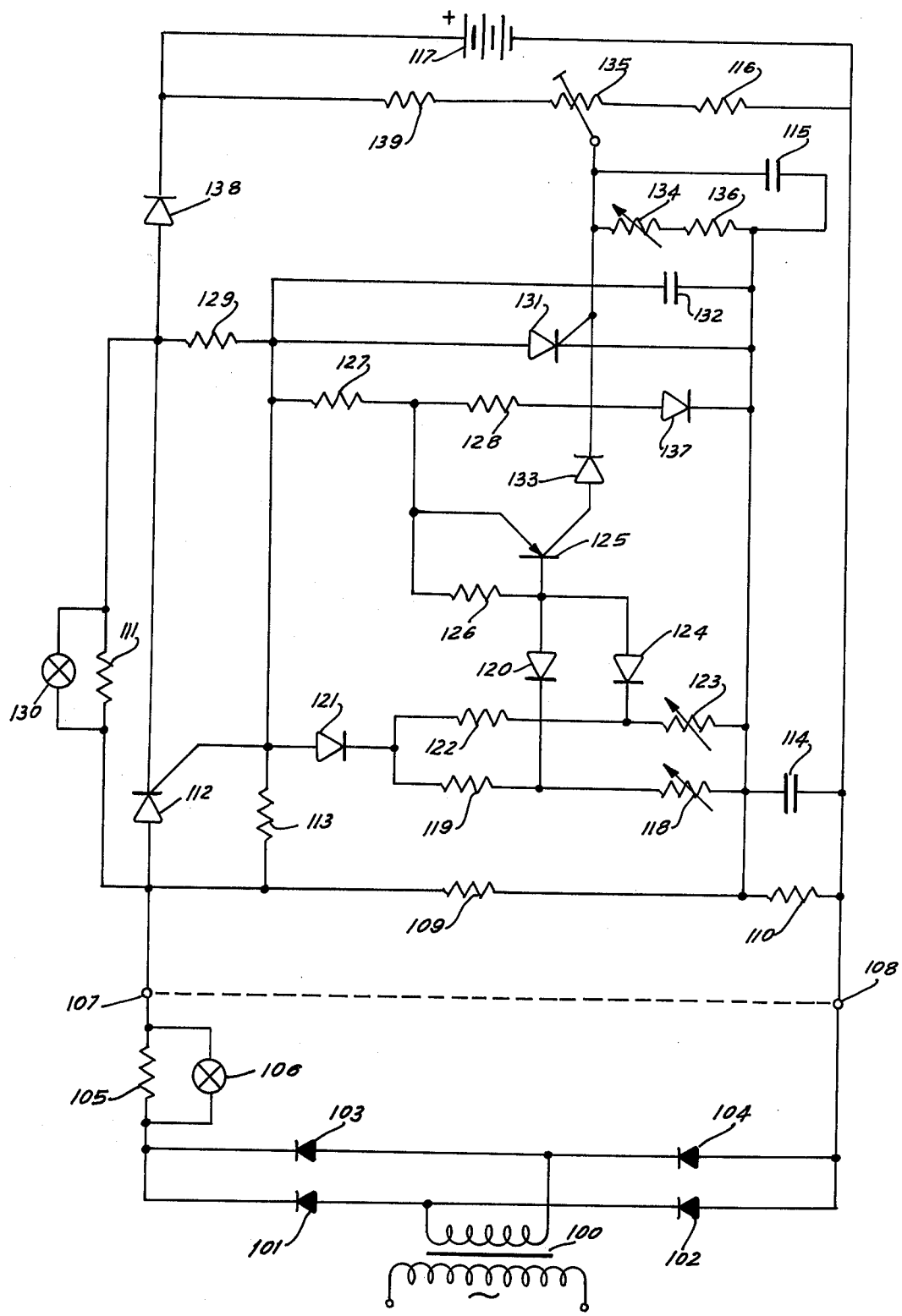
FIG. 1 depicts a first embodiment of the invention in which the threshold value of the control signal for the second switch unit is automatically varied in dependence upon charging voltage.

In FIG. 1, numeral 100 denotes a transformer for stepping down the available mains voltage to a proper amplitude for charging a battery. Connected to the output of the transformer is a bridge rectifier comprised of four diodes 101, 102, 103, 104. Through the intermediary of a resistor 105, across which is connected an indicator lamp 106, the bridge rectifier supplies a full-wave-rectified voltage at the terminals 107, 108 for the actual quick-charge circuit.

The quick-charge circuit includes a voltage divider connected across the supply terminals 107, 108. This voltage divider is comprised, inter alia, of resistors 109 and 110. That terminal of resistor 109 which is connected to supply terminal 107 is also connected to a resistor 111 to the anode of a thyristor 112, and to a further resistor 113; the other terminal of resistor 109 is connected to the negative terminal of the battery 117 to be charged, via a capacitor 114. Capacitor 114 is connected in parallel to voltage-divider resistor 110 and has one terminal connected to a temperature-dependent resistor 118 which in turn is connected to a resistor 119 and the cathode of a diode 120.

Resistor 119 is connected to the cathode of a further diode 121 and to a further resistor 132. The junction between capacitor 114 and temperature-dependent resistor 118 is connected via a conductor to a further temperature-dependent resistor 123, which in turn is connected to the cathode of a diode 124 and also to the resistor 122 already mentioned.

The anodes of the two diodes 120, 124 are connected to each other and to the base of a transistor 125, as well as to a resistor 126. Resistor 126 is connected at its other terminal to the emitter of transistor 125 and also to two further resistors 127, 128, of which resistor 127 is connected via a further resistor 129 to the cathode of thyristor 112 and also to the resistor 111. Connected in parallel with resistor 111 is a lamp 130 which serves as an indicator.

A connection leads from resistor 127 to the anode of a thyristor 131 and to a capacitor 132. Capacitor 132 is connected at its second terminal to the cathode of the thyristor 131. The control electrode (gate) of thyristor 131 is connected to the cathode of a diode 133, to a temperature-dependent resistor 134, and to a potentiometer 135. The anode of diode 133 is connected to the collector of transistor 125. A connection leads from the temperature-dependent resistor 134 via a resistor 136 to the capacitor 132, to the cathode of thyristor 131, to the cathode of a diode 137, and to a capacitor 115. Diode 137 is connected at its anode to the resistor 128. There is a connection between the temperature-dependent resistor 118, 123 and the diode 137. Whereas the negative terminal of the battery to be charged — as already indicated — is connected to the resistor 116, the capacitor 114 and the resistor 110, its positive terminal is connected to the cathode of a diode 138, whose anode is connected to resistor 129, to the cathode of thyristor 112 and to resistor 111.

The cathode of diode 138, and accordingly the positive terminal of battery 117, is connected to a resistor 139 which is connected in series with the potentiometer 135 and the resistor 116.

Before explaining the operation of the circuit depicted in FIG. 1, it should be noted, for the sake of clearer understanding, that the circuit can be subdivided into several functional units.

A first functional unit is comprised of an arrangement serving to establish the firing point of thyristor 131. Thyristor 131 is rendered non-conductive and conductive for effecting transistions between quick-charging to trickle-charging.

This arrangement is essentially comprised of a voltage divider connected in parallel to battery 117 and including the potentiometer 135 and the temperature-dependent resistor 134. The wiper of potentiometer 135 serves to apply to the control electrode of thyristor 131 a control voltage whose magnitude is dependent upon the magnitude of the total voltage drop across the voltage divider, for rendering the thyristor 131 conductive and non-conductive. The purpose of temperature-dependent resistor 134 is to compensate for the temperature-dependent operating characteristics of thyristor 131 in such a manner that, even when the ambient temperature varies, the operating characteristics of the thyristor will remain substantially unaltered.

A second functional unit is comprised of an arrangement for determining a change of the condition of the battery 117 and in response thereto effecting the termination of the quick-charge operation. This arrangement is essentially comprised of the temperature-dependent resistors 118, 123, the resistors 119, 122, 126, 127, 128, the diodes 120, 124, the transistor 125, and also the diode 133. The temperature-dependent resistors 118, 123 are positioned in proximity to respective individual cells of the battery, or to respective groups of battery cells, and serve as temperature sensors. If they detect an excessive temperature, they cause thyristor 131 to become conductive, thereby rendering thyristor 112 non-conductive. The two temperature-dependent resistors 118, 123 are to be considered merely representative of a greater plurality of such resistors; for example, there is no difficulty in providing six such temperature-dependent resistors, each serving to monitor the temperature of a respective one of the cells of the battery 117. By replacing the simple resistors 119, 122 with potentiometers, or the like, it is possible to individually set for each cell the value of the temperature of the cell at which a switchover from quick-charging to trickle-charging for the entire battery 117 is to be effected.

A third functional unit is comprised of an arrangement including the thyristor 112 for the transmission of the quick-charging charging current, with a lamp 130 being provided to indicate that the quick-charging operation is in progress. Connected in parallel to thyristor 112 is a bypass for the transmission of the trickle-charging charging current including the resistor 111.

The fourth and perhaps most important functional unit is essentially comprised of the resistors 109, 110 and the capacitor 114. In this unit, the voltage on capacitor 114, or equivalently on resistor 110, is applied to the cathode of thyristor 131.

The circuit of FIG. 1 operates as follows:

The A.C. mains voltage is stepped down by mains transformer 100 to an appropriate level and is full-wave-rectified by the bridge rectifier 101, 102, 103, 104. Accordingly, there is provided at the supply terminals 107, 108 a full-wave-rectified D.C. voltage whose amplitude fluctuates.

The thyristor 112 for the transmission of the quick-charge charging current is so connected that its anode will be positive relative to its cathode. Because its control electrode (gate) receives a positive potential via the resistor 113, it is initially conductive and transmits a quick-charge charging current of high amplitude to the battery 117, via the charging diode 138.

During this quick-charging operation, indicator lamp 106 is illuminated, because the voltage drop across resistor 106 is proportional to the quick-charge charging current. In contrast, lamp 130, connected in parallel to the thyristor 112, is not illuminated, because the voltage drop across the thyristor 112 when the latter is conductive is too small.

Next to be considered is thyristor 131, which is provided for effecting the switchover from the quick-charge operation to the trickle-charge operation.

The cathode of thyristor 131 is connected via the parallel combination of capacitor 114 and resistor 110 to the negative supply terminal 108, whereas its anode is connected via resistor 113 to the positive supply terminal 107. Thus, the anode-cathode path of the thyristor is connected with a polarity permitting conduction. However, thyristor 131 is not rendered conductive until the voltage applied to its control electrode exceeds a predetermined threshold value. The voltage which must be applied to the control electtrode of thyristor 131 to render it conductive is applied to the control electrode by the wiper of potentiometer 135. The voltage at the potentiometer wiper is equal to a fraction of the voltage of the voltage across the battery 117 undergoing charging. The valve of this fraction can be adjusted by changing the setting of the wiper of potentiometer 135. Thus, if it is assumed that the voltage at the cathode of thyristor 131 is constant, the setting of the wiper of potentiometer 135 determines what value of the voltage across battery 117 should cause thyristor 131 to become conductive. The relationship between the switchover voltage (the voltage across battery 117 which when reached should trigger the switchover from quick-charge to trickel-charge) and the threshold voltage for the control electrode of thyristor 131 should be taken into account when selecting the resistance values of resistors 116, 139 and 135. Also to be taken into account is the range of control-electrode threshold voltages characteristic for the selected type of thyristor.

When the voltage across the batter7y 117 reaches the switchover value, thyristor 131 is accordingly rendered conductive, and current flows through its anode-cathode path. The potential at the anode of thyristor 131 drops towards the negative supply voltage, and this voltage decrease is communicated to the control electrode of thyristor 112, so that the gate potential of the latter will be negative relative to its cathode potential. As a result, the next time the full-wave-rectified current transmitted through the anode-cathode path of thyristor 112 passes through zero value, thyristor 112 will become non-conductive. In this connection, capacitor 115 serves in the first instance to keep thyristor 113 fired, and in the region of the rising flanks of the curent half-waves the potential at the control electrode of thyristor 112 will be kept negative relative to that at its cathode.

With thyristor 112 now non-conductive, trickel-charge charging current, of amplitude markedly lower than the quick-charge charging current, flows through the parallel combination of resistor 111 and lamp 130, and through charging diode 138, into the battery 117. Now, due to the lowered voltage drop across resistor 106, lamp 106 is not illuminated. Thus, lamp 106 indicates quick-charging, and lamp 130 trickle-charging.

The trickle-charging operation lasts until such time as the mains voltage is shut off.

When the mains voltage is switched on again, for the next quick-charging operation, capacitor 132 prevents the possibility of thyristor 131 becoming conductive and accordingly ensures the performance of the quick-charging operation.

As already mentioned, the control electrode of thyristor 131 is connected to the wiper of potentiometer 135 in order to be able to set the firing point of thyristor 131, i.e., the battery voltage at which the wiper of potentiometer 135 will apply to the control electrode of thyristor 131 the threshold voltage required to render the thyristor conductive. In that sense, thyristor 131 can to a certain extent be considered an adjustable threshold switch.

Actually, the threshold voltage of thyristor 131 is not constant, but instead dependent upon temperature. In order to eliminate this temperature dependence, use is made of the temperature-dependent resistor 134. Resistor 134 compensates for drift of the thyristor threshold voltage in one or the other direction by effecting a compensatory elevation or lowering of the voltage applied to the control electrode of the thyristor 131. Nearly complete compensation is possible, because the temperature dependence of resistor 134 quite closely matches that of thyristor 131.

Considering only those parts of the circuit of FIG. 1 whose operation has been discussed above, a disadvantage of the circuit relates to fluctuations in the supply voltage. If the supply voltage at supply terminals 107, 108 fluctuates in amplitude, or is of a constant amplitude which is higher or lower than the anticipated amplitude for which the circuit has been designed, this can result in the simulation of the reaching of the battery switchover voltage. For example, if the supply voltage is for whatever reason higher than anticipated, then the voltage at the wiper of potentiometer 135, applied to the control electrode of thyristor 131, will be correspondingly higher than anticipated. If the cathode of thyristor 131 were fixed at a predetermined value, e.g., grounded, then this enexpectedly higher voltage at the potentiometer wiper would render thyristor 131 conductive before the state of charge of battery 117 had actually reached the desired value. As a result, the thyristor 112 would be rendered non-conductive, and thus the quick-charging operation would end too soon.

In order to compensate for this tendency of the quick-charging operation to end too soon or too late, the circuit of FIG. 1 includes the resistors 109, 110 and the capacitor 114. These form a voltage divider connected across the voltage suppy terminals 107, 108. The voltage at the junction between voltage-divider resistors 109 and 110 is applied to the cathode of thyristor 131, to stabilize the gate-cathode voltage of thyristor 131 against amplitude fluctuations of the supply voltage and against unexpectedly high or low amplitudes of the supply voltage. Specifically, if the amplitude of the supply voltage at terminals 107, 108 rises to a value higher than that contemplated by the designer of the charging circuit, the voltage at the junction of voltage-divider resistors 109, 110 will rise proportionately. This proportionate rise in voltage is transmitted to the cathode of thyristor 131 and offsets the corresponding rise in the voltage at the wiper of potentiometer 135. Thus, although the amplitude of the supply voltage at terminals 107, 108 has increased, and although the voltage at the control electrode of thyristor 131 has increased correspondingly, the actual gate-cathode voltage of thyristor 131 will remain substantially unaltered, in proper correspondence to the unaltered charge condition of the battery 117. If the supply voltage at terminals 107, 108 should unexpectedly decrease in amplitude, the resultant decrease in the voltage applied to the gate of thyristor 131 by the wiper of potentiometer 135 is offset by a corresponding lowering of the voltage applied to the thyristor gate by the voltage divider 109, 110, 114. In this way, a lower or rise of the supply voltage amplitude is not permitted to simulate a later or earlier reaching of the actual battery switchover voltage value. Too early and too late switchover from quick-charging to trickle-charging is accordingly prevented.

Capacitor 114, connected in parallel to voltage-divider resistor 110, serves to smooth out voltage fluctuations to a certain extent.

The circuit of FIG. 1 includes means for automatically terminating the quick-charging operation in the even that any of the cells of the battery should happen to be defective. This part of the circuit is located in the center of FIG. 1 and includes the temperature-dependent resistors 118 and 123, which sense the temperatures of the battery cells. If one of the battery cells is out of order and warms up, the resistance of the associated one of temperature-dependent resistors 118, 123 changes correspondingly.

This results in the change of the state of balance of a bridge circuit. The bridge circuit in question has four sides. One side is constituted by the resistor 127. The second side is constituted by the series connection of resistor 128 and diode 137. The third side is constituted by diode 121 and the two resistors 119 and 122. The fourth side is constituted by the temperature-dependent resistors 118 and 123. To appreciate that elements 121, 122, 119 from the third side of the bridge and elements 118, 123 the fourth side of the bridge, it should be noted that the junction between resistors 122 and 123 is, in effect, identical to the junction between resistors 119 and 118. In fact, these two junctions are joined together at the anodes of the two diodes 120 and 124. Diodes 120 and 124 are provided for the sole purpose of decoupling the temperature-dependent resistors 118, 123 from each other. Thus, to help visualize the bridge circuit, one can image diodes 118, 123 replaced by simple conductors.

The diagonal of the bridge circuit extends between two corners of the bridge circuit; the first corner is the junction between resistors 127 and 128, the second corner is the junction between the anodes of diodes 120 and 124 (equivalently, the junction of resistors 122, 119, 123, 118). The diagonal of the bridge circuit is constituted by the base-emitter path of transistor 125 and the base-emitter resistor 126 of the transistor.

If none of the battery cells is overheating, the state of balance of the bridge circuit will be such that the base-emitter voltage of transistor 125, connected in the diagonal of the bridge, will be insufficient to render transistor 125 conductive. In contrast, if one or both of the battery cells associated with temperature-dependent resistors 118, 123 overheats, the state of balance of the bridge circuit will be such that its diagonal voltage (the base-emitter voltage of transistor 125) will be of the proper polarity and of sufficient magnitude to render transistor 125 conductive. As a result, the emitter-collector voltage of the transistor 125 will decrease markedly, so that the voltage at the control electrode of thyristor 131 will be equal to the voltage at the junction of resistors 127, 128, minus the small emitter-collector voltage of transistor 125, and minus the small anode-cathode voltage of diode 133. This voltage at the control electrode of thyristor 131 will be substantially higher than its cathode voltage. As a result, thyristor 131 will be rendered conductive and, in the manner already described, the quick-charging operation will terminate.

The diodes 121, 133 and 137 in the circuit of FIG. 1 are provided to introduce temperature compensation for the bridge circuit just described, and in particular for the transistor 125 thereof.

Figure 2:
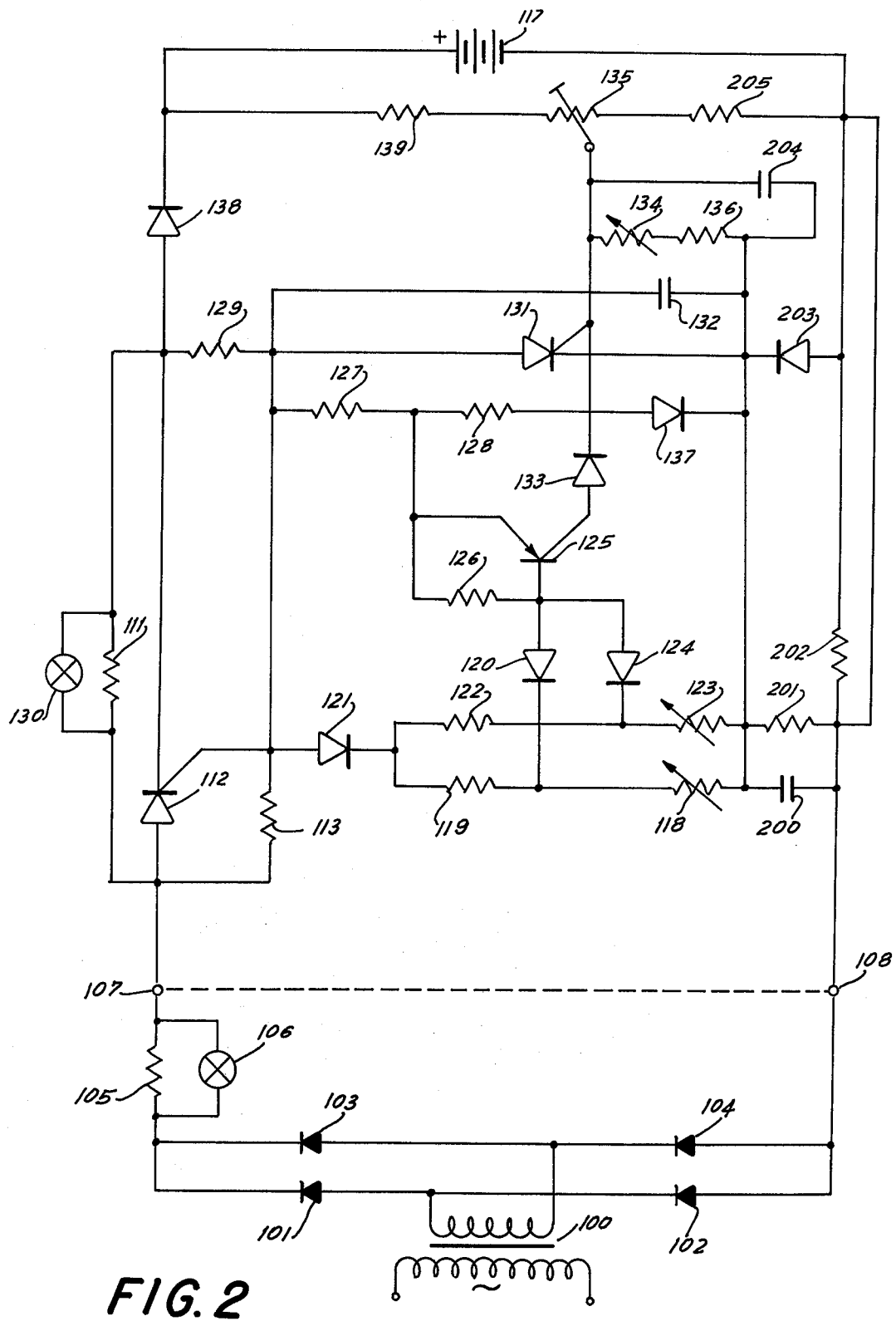
FIG. 2 depicts a second embodiment in which the automatic variation of the threshold value is dependent upon charging current.

FIG. 2 depicts a second embodiment of the invention. Most of the circuit components of FIG. 2 correspond exactly to those of FIG. 1, and are denoted by identical reference numerals. The components in FIG. 2 not corresponding to those in FIG. 1 are denoted by reference numerals 200 and higher.

In the circuit of FIG. 2, the voltage divider 109, 110, 114 of FIG. 1, operative in that Figure for applying to the cathode of thyristor 131 a potential varying in proportion to the amplitude of the supply voltage, has been removed. Instead, there have been provided a capacitor 200 and a parallel-connected resistor 201 between the junction of temperature-dependent resistors 118, 123 and the negative supply voltage terminal 108. A resistor 202 has been introduced into the path of the charging current for battery 117. The lower terminal of resistor 202 is connected to the negative supply voltage terminal 108. The upper terminal of resistor 202 is connected, via a diode 203, to the cathode of thyristor 131.

Because resistor 202 is provided in the path of the battery-charging current, the voltage drop across resistor 202 is proportional to that current. The upper terminal of resistor 202 will be positive relative to its lower terminal, and the positive voltage at such upper terminal is transmitted, via diode 203, to the cathode of thyristor 131.

If it should happen that the amplitude of the supply voltage at supply voltage terminals 107, 108 increases to a level higher than the designed valve, then as before the voltage applied to the control electrode of thyristor 131 by the wiper of potentiometer 135 will increase correspondingly, although the actual state of the battery charge has not increased correspondingly. However, the increase in the supply voltage produces a proportionate increase in the charging current, and therefore a proportionate increase in the voltage applied to the cathode of thyristor 131 by the resistor 202 via diode 203. Thus, the gate-cathode voltage of thyristor 131 will be substantially unaltered, despite the increase in the amplitude of the supply voltage, and will accordingly continue to accurately reflect the true state of charge of battery 117.

It will be understood that each of the elements described above, or two or more together, may also find a useful application in other types of circuits differing from the types described above.

While the invention has been illustrated and described as embodied in a battery-charging circuit having automatic switchover from the quick-charge to the trickle-charge operating modes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A circuit of the type used for charging a battery from a voltage source, comprising, in combination, voltage supply terminals for connection to a voltage source; battery connection terminals for connection to a battery to be charged; circuit means connecting said voltage supply terminals to said battery connection terminals for the transmission of a charging voltage having a charging voltage value and providing a current path for the flow of charging current having a charging current value, including first controllable switch means connected in said charging current path and having a conductive state and a non-conductive state; second controllable switch means connected to said first controllable switch means and operative upon the receipt of a control signal having a predetermined threshold value for changing the state of said first controllable switch means; means for applying to said second controllable switch means a control signal having a value varying in dependence upon variations in one of said charging values; and means for changing said threshold value of said second controllable switch means in automatic dependence upon changes in one of said charging values.

2. The circuit defined in claim 1, said means for changing said threshold value comprising means for changing said threshold value by applying to said second controllable switch means a signal whose value varies in proportion to variations in one of said charging values.

3. The circuit defined in claim 2, said first and second switch means comprising respective first and second electronic switches.

4. The circuit defined in claim 3, each of said switches having two main electrodes and a control electrode, the main electrodes of said first switch being connected in said charging current path, one of the main electrodes of said second switch being connected to the control electrode of said first switch for controlling the state of said first switch, said means for applying said control signal comprising means for applying said control signal to the control electrode of said second switch, said means for changing said threshold value comprising means for applying to the other of the main electrodes of said second switch a voltage varying in dependence upon changes in one of said charging values.

5. The circuit defined in claim 4, said means for changing said threshold value comprising a voltage divider connected across said voltage supply terminals and having a voltage-divider tap connected to said other main electrode of said second switch for applying thereto a voltage varying in dependence upon changes in the voltage across said voltage supply terminals.

6. The circuit defined in claim 5, said voltage divider comprising at least two resistors the junction between which constitutes said tap and also including a capacitor connected in parallel with one of said resistors.

7. The circuit defined in claim 4, said means for changing said threshold value comprising a resistor connected in said charging current path, whereby the voltage drop across said resistor is substantially proportional to charging current, and connected to said other main electrode of said second switch for applying thereto a voltage dependent upon the voltage drop across said resistor.

8. The circuit defined in claim 7, said first and second switches being first ans second thyristors, said one main electrode of said second thyristor being its anode, said other main electrode of said second thyristor being its cathode, said means for changing said threshold value additionally including a diode, said resistor being connected to said cathode by said diode.

9. The circuit defined in claim 8, said diode having an anode connected to said resistor and a cathode connected to the cathode of said second thyristor, said means for changing said threshold value further including a resistor and capacitor having first terminals connected to said cathode of said diode and second terminals connected in common to one of said voltage supply terminals.

10. The circuit defined in claim 8, said second switch means further including means for compensating for the temperature dependence of said second thyristor including a temperature-dependent resistor connected to the gate electrode of said second thyristor.

11. The circuit defined in claim 2, said circuit means further including temperature sensing means capable of sensing the temperature of at least one cell of a battery connected to said battery connection terminals and operative when sensing a predetermined temperature for causing said first switch means to assume said non-conductive state.

12. The circuit defined in claim 11, said temperature sensing means comprising a bridge circuit having four branches and a diagonal, one of said branches being comprised of a plurality of temperature-dependent resistors capable of sensing the temperatures of respective cells of a battery being charged, and a transistor circuit connected in said diagonal of said bridge circuit and connected to said second switch means and operative for applying thereto a control signal having at least said threshold value in response to imbalance of said bridge circuit resulting from temperature-dependent variations in the resistances of said temperature-dependent resistors.

13. The circuit defined in claim 12, said bridge circuit furthermore including adjustable resistors connected to respective ones said temperature-dependent resistors for individually presetting the temperature which the associated temperature-dependent resistor must reach to produce imbalance of said bridge circuit great enough to cause said transistor to apply said control signal having at least said threshold value.

14. The circuit defined in claim 1, said second controllable switch means comprising a controllable electronic switch having first and second main electrodes and a control electrode, said first main electrode being connected to said first switch means for controlling the state of the latter, said means for applying said control signal comprising means operative for applying to said control electrode a control voltage whose value varies in correspondence to the voltage across said battery connection terminals, whereby a change in the value of the voltage across said battery connection terminals resulting not from any change in the state of charge of a battery connected thereto but instead resulting exclusively from a change in the value of the voltage applied to said voltage supply terminals produces a battery-independent change in the value of said control voltage undesirably simulating a change in the state of charge of such battery, said means for changing said threshold value comprising means for applying to said second main electrode a voltage varying in correspondence to the voltage across said voltage supply terminals, whereby the battery-independent change in the value of the control voltage applied to said control electrode is offset by a corresponding change in the value of the voltage applied to said second main electrode, so that the voltage difference between said control electrode and said second main electrode will be determined substantially exclusively by the actual state of charge of a battery connected across said battery connection terminals.

15. The circuit defined in claim 14, said means for applying a control voltage comprising a voltage divider connected across said battery connection terminals and having a voltage-divider tap connected to said control electrode, said means for changing said threshold value comprising a second voltage divider connected across said voltage supply terminals and having a voltage-divider tap connected to said other of said main electrodes.

16. The circuit defined in claim 1, said second controllable switch means comprising a controllable electronic switch having first and second main electrodes and a control electrode, said first main electrode being connected to said first switch means for controlling the state of the latter, said means for applying said control signal comprising means operative for applying to said control electrode a control voltage whose value varies in correspondence to the voltage across said battery connection terminals, whereby a change in the value of the voltage across said battery connection terminals resulting not from any change in the state of charge of a battery connected thereto but instead resulting exclusively from a change in the value of the voltage applied to said voltage supply terminals produces a battery-independent change in the value of said control voltage undesirably simulating a change in the state of charge of such battery, said means for changing said threshold value comprising means for applying to said second main electrode a voltage varying in correspondence to the charging current flowing into and out of said battery connection terminals, whereby the battery-independent change in the value of the control voltage applied to said control electrode is offset by a corresponding change in the value of the voltage applied to said second main electrode, so that the voltage difference between said control electrode and said second main electrode will be determined substantially exclusively by the actual state of charge of a battery connected across said battery connection terminals.

17. The circuit defined in claim 16, said means for applying a control voltage comprising a voltage divider connected across said battery connection terminals and having a voltage-divider tap connected to said control electrode, said means for changing said threshold value comprising a resistor connected in said charging current path and means for applying to said second main electrode a voltage determined by the voltage drop across said resistor.

* * * * *